C. S. BATEMAN.
DUMPING-WAGON.

No. 192,892. Patented July 10, 1877.

WITNESSES:
C. Neveux
J. H. Scarborough

INVENTOR:
C. S. Bateman
BY Munn
ATTORNEYS.

N. PETERS, PHOTO-LITHOGRAPHER, WASHINGTON, D. C.

UNITED STATES PATENT OFFICE.

CHARLES S. BATEMAN, OF BATTLE CREEK, MICHIGAN.

IMPROVEMENT IN DUMPING-WAGONS.

Specification forming part of Letters Patent No. 192,892, dated July 10, 1877; application filed May 28, 1877.

*To all whom it may concern:*

Figure 1:
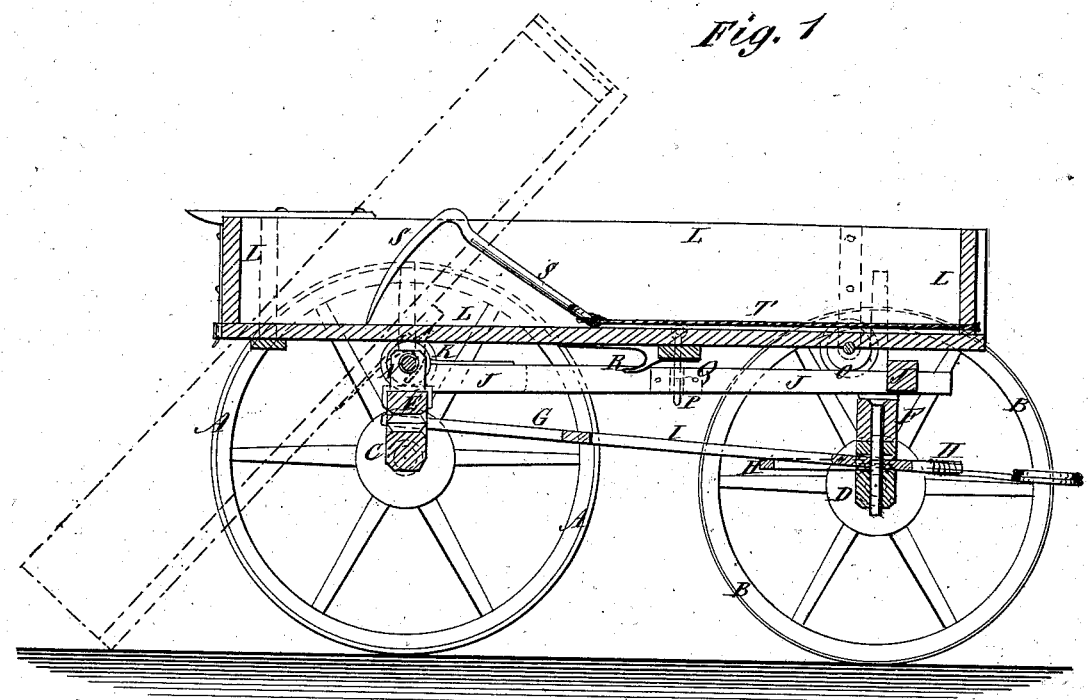
Figure 2:
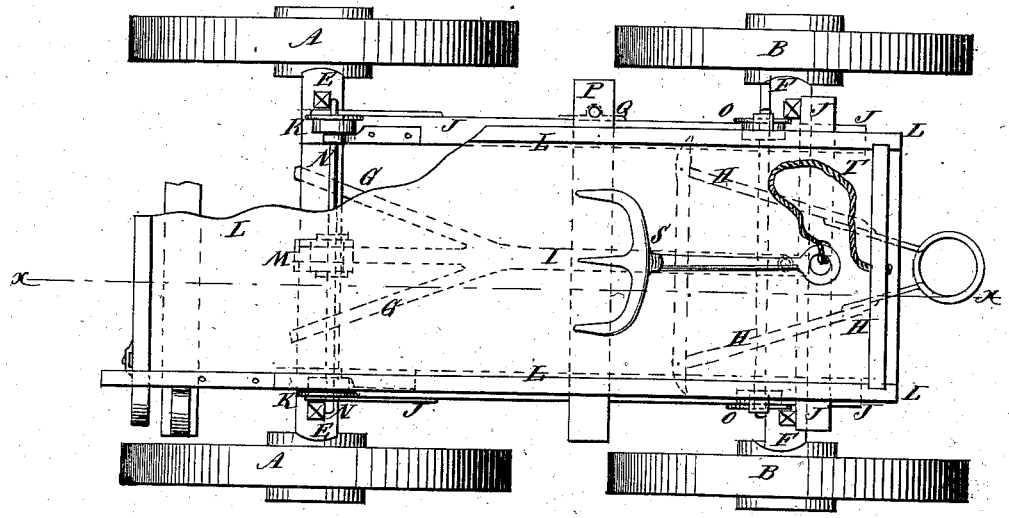

Be it known that I, CHARLES S. BATEMAN, of Battle Creek, in the county of Calhoun and State of Michigan, have invented a new and useful Improvement in Self-Dumping Wagons, of which the following is a specification:

Figure 1 is a vertical longitudinal section of my improved dumping-wagon, taken through the line $x$ $x$, Fig. 2. Fig. 2 is a top view of the same, part being broken away to show the construction.

Similar letters of reference indicate corresponding parts.

The object of this invention is to furnish an improved wagon, which shall be so constructed that it will dump itself when unfastened and started forward, which may be made to discharge part or all the load at a time, and which shall be simple in construction and convenient in use.

The invention will first be described in connection with the drawing, and then pointed out in the claim.

A A are the rear wheels. B B are the fore wheels. C is the rear axle. D is the fore axle. E is the rear bolster. F is the fore bolster. G G are the rear hounds. H H are the fore hounds, and I is the reach, all of which parts are constructed in the usual way.

J is a frame, consisting of two side bars and a front cross-bar. The ends of the cross-bar project, and rest against the forward side of the forward stakes.

To the rear ends of the side bars of the frame J are pivoted two wheels, K, in such positions as to be over the rear axle C, and which have flanges upon their outer sides to keep the wagon-box L in place upon them.

M is a third wheel, which is secured to the center of the rear axle C by a clip, and which is made without flanges, for the bottom of the wagon-box L to rest upon it.

The three wheels K M K revolve upon a rod, N, attached to the rear end of the side bars of the frame J, and the ends of which project, and rest against the forward side of the rear stakes.

To supports attached to the forward parts of the side boards of the wagon-box L are pivoted two wheels, O, which rest and roll upon the side bars of the frame J, and have flanges upon their outer sides to keep them in place upon said side bars. The running gearing of the wagon is so constructed that the forward end of the box L may be enough higher than the rear end to cause the said box to run back and dump itself when the wagon is started forward.

The wagon-box L is fastened in place by a pin, P, which passes through the end of the central cross-bar of the said box L, and through an eye or keeper, Q, attached to the side bar of the frame J, which pin is withdrawn when the wagon is to be dumped.

To the bottom of the wagon-box L, a little in front of its center, are attached two hooks, R, which, when the box L runs back, catch upon the rod N, and thus keep the said box from becoming disconnected with the frame J. The hooks R are so placed that, when the box L is run back to bring the said hooks in contact with the rod N, the rear end of the box when loaded will be the heavier, and will tilt to dump the load, and when unloaded the wheels O will make the forward end the heavier, so that the box, when the load is dumped, will return to its position upon the frame J, and can then be easily run forward and secured by the pin P.

S is a hook, the shank of which is attached to the end of a rope, T. The other end of the rope T is attached to the forward end of the box L. The rope T is made of such a length that the hook S will reach nearly to the rear end of the box L.

When only part of the load is to be dumped in a place, the hook S is thrust down through the load at the desired point, and when the box L is tilted the part of the load in the rear of the fork S will run out, and the rest will be retained.

With this construction, by detaching the frame L and its attached wheels K M K, and placing the box L upon the bolsters E F, an ordinary wagon will be produced.

Having thus described my invention, I claim as new and desire to secure by Letters Patent—

In combination with the box and running gear, the intermediate frame J, wheels K M K, and flanged wheels O O, all constructed and arranged as shown and described, to form a dumper operated by the horses in unloading, as set forth.

CHARLES S. BATEMAN.

Witnesses:
BENJAMIN C. McBETH,
GEORGE BANNERMAN.